United States Patent [19]

Kim

[11] Patent Number: 5,067,023
[45] Date of Patent: Nov. 19, 1991

[54] IMAGE DATA CODING APPARATUS

[75] Inventor: Eun J. Kim, Seoul, Rep. of Korea

[73] Assignee: Samsung Electronics Co., Ltd., Suwon, Rep. of Korea

[21] Appl. No.: 544,946

[22] Filed: Jun. 28, 1990

[30] Foreign Application Priority Data

Jun. 29, 1989 [KR] Rep. of Korea .................... 89-9105

[51] Int. Cl.[5] ........................................... H04N 1/419
[52] U.S. Cl. ................................. 358/261.1; 358/426
[58] Field of Search ........................ 358/261.1–261.3, 358/426

[56] References Cited

U.S. PATENT DOCUMENTS

| 4,800,441 | 1/1989 | Sato | 358/426 |
| 4,939,583 | 7/1990 | Tsuboi et al. | 358/261.1 |
| 4,955,061 | 9/1990 | Doi et al. | 358/261.1 |

Primary Examiner—Stephen Brinich
Attorney, Agent, or Firm—Cushman, Darby & Cushman

[57] ABSTRACT

The image data coding apparatus of the present invention includes a First-In, First-Out memory, a pixel color discriminating section, black and white run length calculating sections, black and white code look-up tables, parallel input/serial output shift resisters, and a valid bit detecting section. The FIFO memory sequentially reads binary image data, and outputs them in the inputted order. The pixel color discriminating section discriminates the color of the pixels outputted from the FIFO memory. The black and white run length calculating sections calculate the run lengths of the pixels after the discriminations of the color of the pixels by the pixel color discriminating section. The code look-up table outputs the relevant codes in byte units after receipt of the code address from the black and white run length calculating sections. The parallel input/serial output shift register converts the parallel output data of the look-up table into serial data. The valid bit detecting section outputs parallel data in byte units after extracting only the valid bits among the serial data outputted from the parallel input/serial output shift register.

4 Claims, 6 Drawing Sheets

FIG. 1

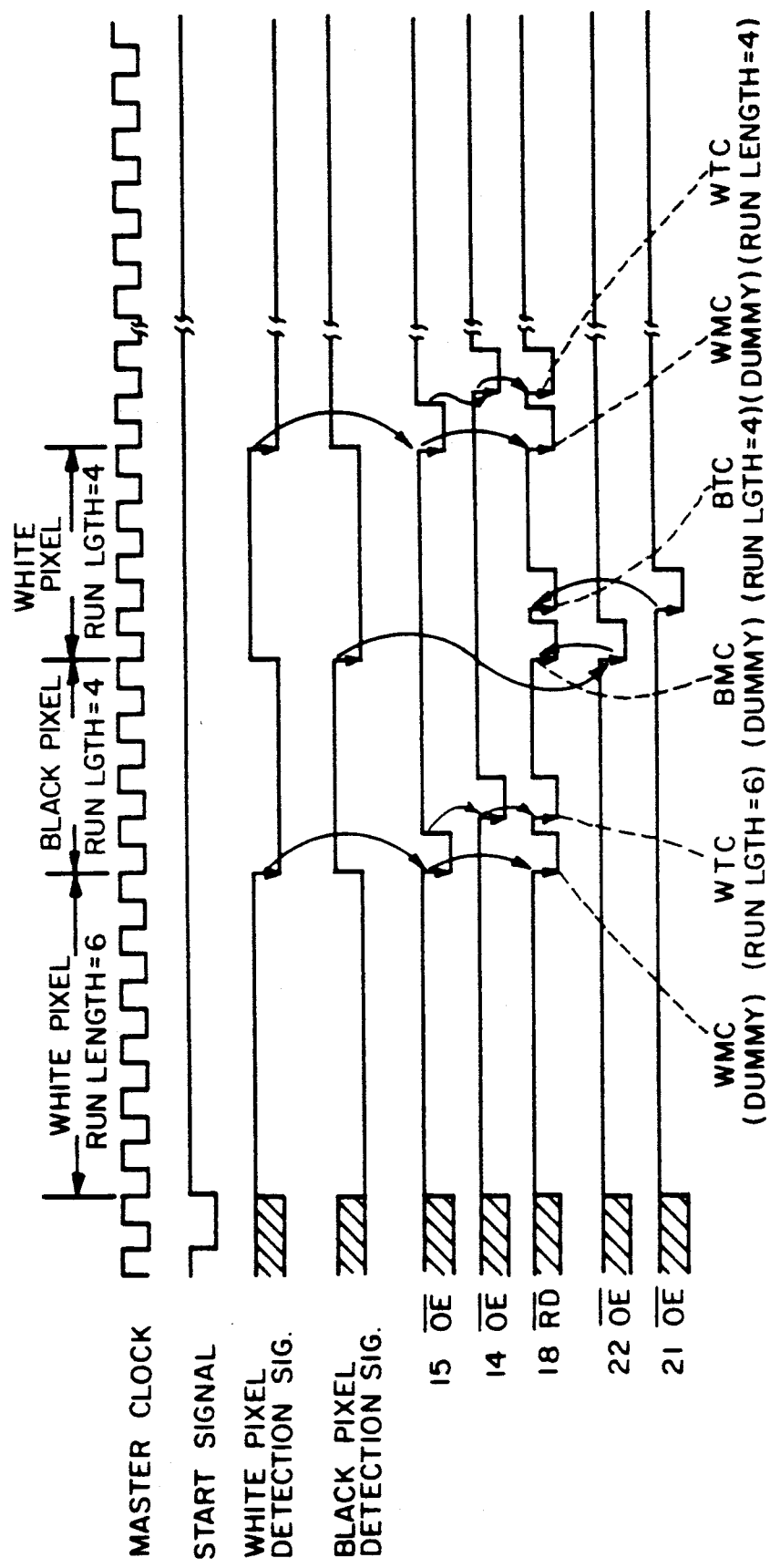

FIG. 6

```
0000 ┌─────────────────────────────────────┐
     │  TERMINATING CODES FOR              │
     │     WHITE PIXEL RUN LENGTH 0-63     │
0127 │                                     │
0128 ├─────────────────────────────────────┤
     │  MAKE-UP CODES FOR                  │
     │     WHITE PIXEL RUN LENGTH 64-2560  │
0207 │                                     │
     ├─────────────────────────────────────┤
     │              BLANK                  │
0256 ├─────────────────────────────────────┤
     │  TERMINATING CODES FOR              │
     │     BLACK PIXEL RUN LENGTH 0-63     │
0383 │                                     │
0384 ├─────────────────────────────────────┤
     │  MAKE-UP CODES FOR                  │
     │     BLACK PIXEL RUN LENGTH 64-2560  │
0463 │                                     │
     ├─────────────────────────────────────┤
     │              BLANK                  │
     └─────────────────────────────────────┘
```

FIG. 7

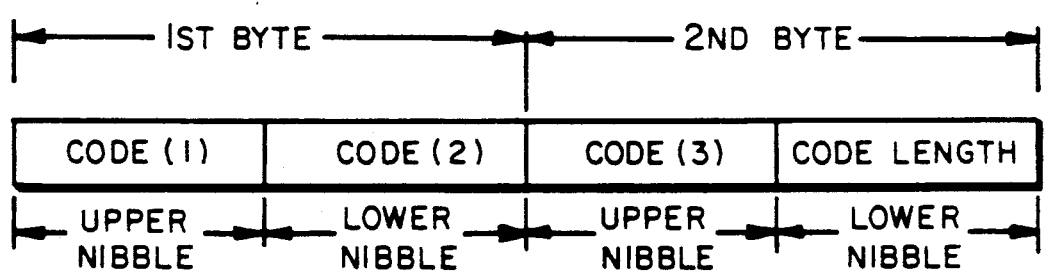

IMAGE DATA CODING APPARATUS

FIELD OF THE INVENTION

The present invention relates to an image data coding apparatus, and particularly to an apparatus for compressing and coding the inputted image data in order to efficiently store or transmit the image data in an image processing system such as an image scanner or a facsimile in which the inputted image data have one dismentaional correlations.

BACKGROUND OF THE INVENTION

In the conventional image scanners or facsimiles, the compressions of the black and white binary image data are carried out primarily by softwares, and however, according to this method, the processing time is considerably long, with the result that there is encountered a difficulty in compressing the data with real time. Particularly, in the case where the image data should be inputted at a high speed as in an image scanner, an exclusive compressing apparatus is necessarily required.

As an image data compressing/coding apparatus which complies with the above described requirement, there is provided an image signal coding apparatus which is disclosed in U.S. Pat. No. 4,799,110 patented to Hisada et al. This conventional image signal coding apparatus comprises reference and coding line pixel change point detecting circuits, reference line shift registers, a coding line shift register, a symbol detecting circuit, coding and reference line ROM tables, and a code determining circuit.

This conventional apparatus selectively uses MH(Modified Huffman) coding scheme known as a one dimensional coding scheme, MR(Modified READ) coding scheme or MMR(Modified Modified READ) coding scheme, the latters being known as two dimensional coding scheme, thereby making it possible to selectively code one dimensional image data or two dimensional image data.

Thus, due to the fact that the above conventional apparatus is capable of using plural coding schemes, separate processing means for the reference line has to be provided in addition to processing means for coding line, so that the construction of the apparatus become very complicated. Further, during the final process of generating the codes for the coding line image signals, the ROM table receives the output of the symbol detecting circuit in addition to the output of the run length couter, and further cooperates with the code determinating circuit, thereby making the sequence of the processing complicated.

Meanwhile, on considering the characteristics of the black and white binary image data to be coded, it can be seen that there are high probabilities of the identical color pixel occurrence in successive pixels. That is, if a black pixel appears, then the pixels of the identical color continuously appear for a certain length. Successively, a white pixel appears, then the pixels of the identical color continuously appear. In such a succeeding pixels, a pixel of a certain color next to the final pixel of the preceding image data of different color is defined as "a change point", and the number of the succeeding pixels of image data representing an identical color as "a run length" in the art. The usual data compression is carried out based on the generation frequency of such a run length. For example, the shortest codes are allocated to the run length of which the generation frequency is highest, while the longest codes are allocated to the run length of which the generation frequency is lowest. Thus, this coding method is called a variable length coding method, and the adoption of this method is advantageous for enhancing the data compressing efficiency.

For this reason, the one dimensional image data codes have been made to comply with the modified Huffman coding scheme according to the T4 regulation recommended by CCITT (International Consultative Committee for Telephone and Telegraph).

SUMMANRY OF THE INVENTION

Therefore, it is the object of the present invention to provide an image data coding apparatus which resorts to the modified Huffman coding method according to the T4 regulation recommended by CCITT, and has a construction simpler than that of the conventional image data coding apparatus.

In achieving the above object, the image data coding apparatus according to the present invention comprises a FIFO (first-in first-out) memory for sequentially reading the binary image data from an image input device such as an image pick-up, and for outputting said binary image data in the inputted order: a pixel color discriminating section for discriminating the color of the pixels outputted from the memory; black/white run length calculating sections for calculating the run length of the pixel of which color has been discriminated by the pixel color discriminating section; black/white code look-up tables for receiving the address of the code position corresponding to the pixel run length generated from the black/white run length calculating sections, and for outputting relevant codes in byte units; parallel input/serial output shift registers for converting the parallel data outputted by the look-up table into a serial data; and a valid bit detecting section for extracting only the valid bit among the serial data outputted from the shift registers, and for generating parallel data in byte units.

BRIEF DESCRIPTION OF THE DRAWINGS

The above object and other advantages of the present invention will become more apparent by describing in datail the preferred embodiment of the present invention with reference to the attached drawings in which:

FIG. 5 is a timing chart for explaining the process of datecting the chang point in a string composed of black and white pixels;

FIG. 6 is a memory address map of the black/white code look-up table;

FIG. 7 illustrates the structure of the data stored in the look-up table; and

DETAIED DESCRIPTION OF THE PREFERRED EMBODIMENT

Figure 1:
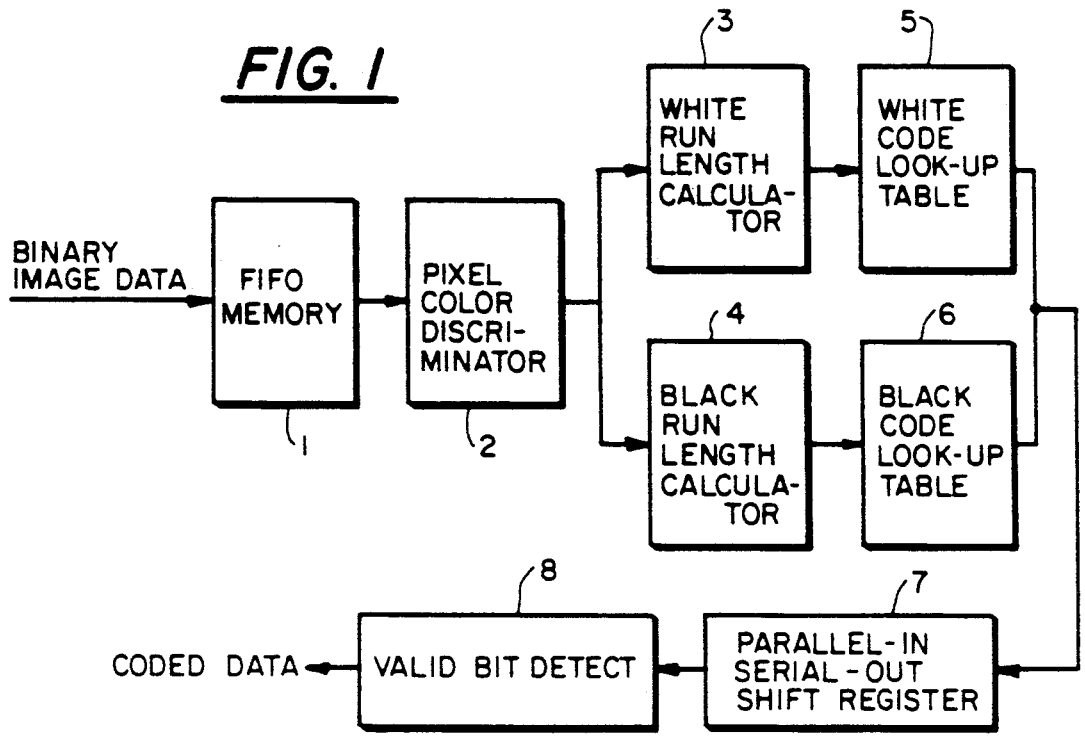
FIG. 1 is a block diagram of an image data coding apparatus according to the present invention.

In the scanned lines which are to be coded according to the coding apparatus of the present invention, black pixels and white pixels are alternatively arranged. Here, all the scanned lines are assumed to have a white pixel for the initial pixel in order to maintain the color synchronization between the coding apparatus of the present invention and the peripheral equipment connected to the apparatus of the present invention to receive the codes from the same. If, in any one of the lines, the actual initial pixel consists of a black pixel, then a data "0" corrsponding to the white pixel is forcedly appended to the head portion of the line.

The codes corresponding to the respective run lengths of the black and white pixels according to the modified Huffman coding scheme are disclosed in Tables 1A through 1C.

Either one of the run lengths is represented by two kinds of codes, i.e., a terminating code and a make-up code. In other words, pixels having a run length from 0 to 63 are transmitted in the form of a single terminating code (Table 1A), and pixels having a run length from 64 to 2592 are transmitted in the form of the combination of a make-up code (Table 1B or 1C) and a terminating code (Table 1A). The make-up code represents the value of the run length corresponding to 64×N, which is equal to or less than the value of the run length to be transmitted. Here, N is an integer in the range of 1 through 40. The rest of the pixels corresponding to the difference between the run length of the selected make-up code and the run length of the actual pixels are coded into a terminating code.

An EOL (End-of-Line) code is added to the ends of the coded lines. This EOL code is a particular one which is different from the codes generated from the usual pixel data, and a decoding apparatus distinguishes the respective lines based on the codes to maintain the line synchronization.

TABLE 1A

| Terminating codes (run length: 0–63) | | | |
|---|---|---|---|
| White run length | Codes | Black run length | Codes |
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| . | . | . | . |
| 61 | 00110010 | 61 | 000001011010 |
| 62 | 00110011 | 62 | 000001100110 |
| 63 | 00110100 | 63 | 000001100111 |

TABLE 1B

| Make-up Codes (run length: 64–1728) | | | |
|---|---|---|---|
| White run length | Codes | Black run length | Codes |
| 64 | 11011 | 64 | 0000001111 |
| 128 | 10010 | 128 | 000011001000 |
| 192 | 010111 | 192 | 000011001001 |
| 256 | 0110111 | 256 | 000001011011 |
| 320 | 00110110 | 320 | 000000110011 |
| . | . | . | . |
| 1664 | 011000 | 1664 | 0000001100100 |

TABLE 1B-continued

| Make-up Codes (run length: 64–1728) | | | |
|---|---|---|---|
| White run length | Codes | Black run length | Codes |
| 1728 | 010011011 | 1728 | 0000001100101 |

TABLE 1C

| Common Make-up Codes (run length: 1792–2560) | | | |
|---|---|---|---|
| Run length (black & white) | Codes | Run length (black & white) | Codes |
| 1792 | 00000001000 | 2432 | 000000011101 |
| 1856 | 00000001100 | 2496 | 000000011110 |
| 1920 | 00000001101 | 2560 | 000000011111 |
| . | | EOL | 000000000001 |
| . | | | |

The overall constitution of the apparatus of the present invention is illustrated in FIG. 1. Referring to FIG. 1, a FIFO (First-in, First-out) memory 1 sequentially reads binary image data through an image input device, and outputs them in the inputted order. Here, a white pixel is represented by a logic "0", and a black pixel expressed by a logic "1".

A pixel color discriminating section 2 discriminates the white or black color based on the logic level outputted from the FIFO memory 1. In the case the pixels of the identical color are succeeding, a white run length calculating section 3 or a black run length calculating section 4 counts the run lengths of the succeeding pixels for the relevant color and supplies the counted values to code look-up tables 5,6.

Further, the white run length calculating section 3 and the black run length calculating section 4 make decisions based on the counted values of the succeeding pixel run lengths as to whether the run length should be coded in a single terminating code or by a combination of a make-up code and a terminating code. The counted values are supplied to an address terminal of a code look-up table consisting of a memory device such as ROM, that is, the counted values are utilized as the relevant address of ROM device where a certain code corresponding to the run length of the pixel is stored. Accordingly, the look-up table outputs the code stored into the above mentioned address, the outputting of code being done in units of 8 bits.

As will be fully described later, according to the embodiment of the present invention, the look-up table outputs code of two bytes in total for the respective black and white run lengths. Here, the first byte and the upper nibble of the second byte represents a code corresponding to the run length, while the lower nibble of the second byte represents expresses the valid bit length of the code.

As shown in Tables 1A to 1C, the codes for the respective black and white run lengths have variable lengths in the range of 2–12 bit, and therefore, the data outputted by the look-up tables 5,6 in byte units may include redundancy bits besides the valid bits of variable length. For example, if the run length for the white pixels is 2, then, as shown in Table 1A, the actual code corresponding to the same is "0111". However, as shown in Table 2, the first byte data outputted from the white code look-up table 5 includes four redundancy bits in the form of "0000" in addition to the valid bits "0111", and the upper nibble of the second byte also includes four redundancy bits "0000".

Such redundancy bits act as a factor for reducing the data compression efficiency, and therefore, according to the present invention only the valid bits are extracted from the codes consisting of 12 bits in order to enhance the data compression efficiency.

For this purpose, the apparatus of the present invention is constituted such that serial codes are obtained from a parallel-serial shift register 7 by supplying the parallel codes outputted in byte units from the look-up tables 5, 6 to the parallel-serial shift register 7, and these serial codes are in turn supplied to a valid bit detecting section 8 where the valid bit will be finally extracted and outputted in byte units.

Figure 2:
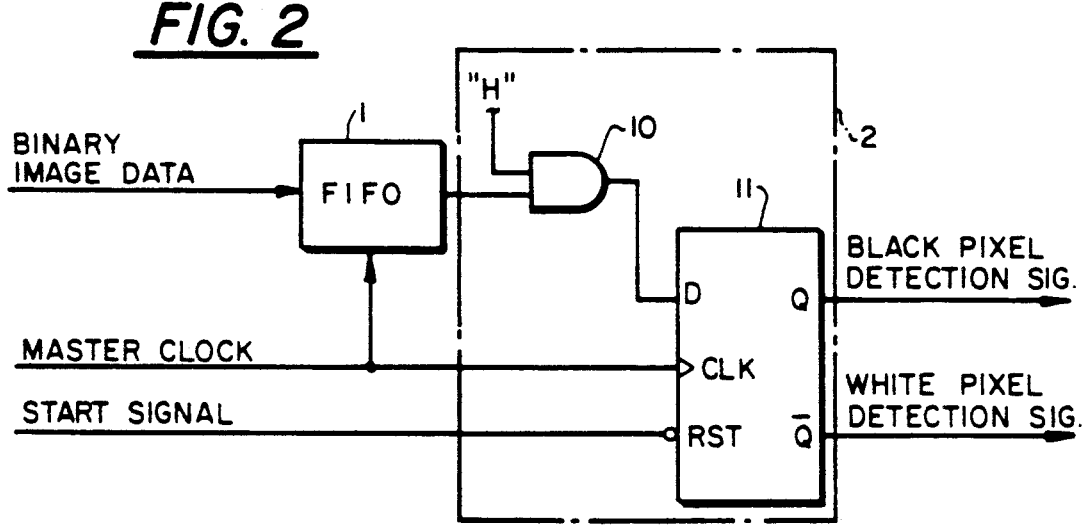
FIG. 2 is a detailed circuit diagram the black/white pixel color discriminating section in FIG. 1.

FIG. 2 illustrates the connection between the FIFO memory 1 and the color discriminating circuit 2 of FIG. 1, the latter discriminates whether the color of the sequentially inputted pixels are of black or white color.

According to the coding regulation, the initiation of each line should be white color, and therefore, if the starting signal is inputted, then as shown in FIG. 5, first the white pixel detecting signal is produced from the color discriminating circuit 2, and then black or white pixel detecting signal is produced at the different output terminals of the color discriminating circuit 2 based on the actual image data from the FIFO memory 1, said black and white pixel detecting signals being in turn applied to pixel run length calculating circuit of the next stage.

Now the constitution of the pixel color discriminating circuit 2 will be described in more detail. The data outputted from the FIFO memory 1 are supplied through an AND gate 10 to the D input terminal of a D flip-flop 11. D flip-flop 11 is provided with a first output terminal Q for outputting black pixel detecting signals and a second output terminal $\overline{Q}$ for outputting white pixel detecting signals. When the start signal is supplied to the reset terminal of D flip-flop 11 a $\overline{Q}$ output terminal outputs a white pixel detecting signal. FIG. 5 illustrates the wave forms of the respective detecting signals for the case the pixel data are inputted in the sequence of white pixels of run length=6, black pixels of run length=4 and white pixels of run length=4.

Figure 3:
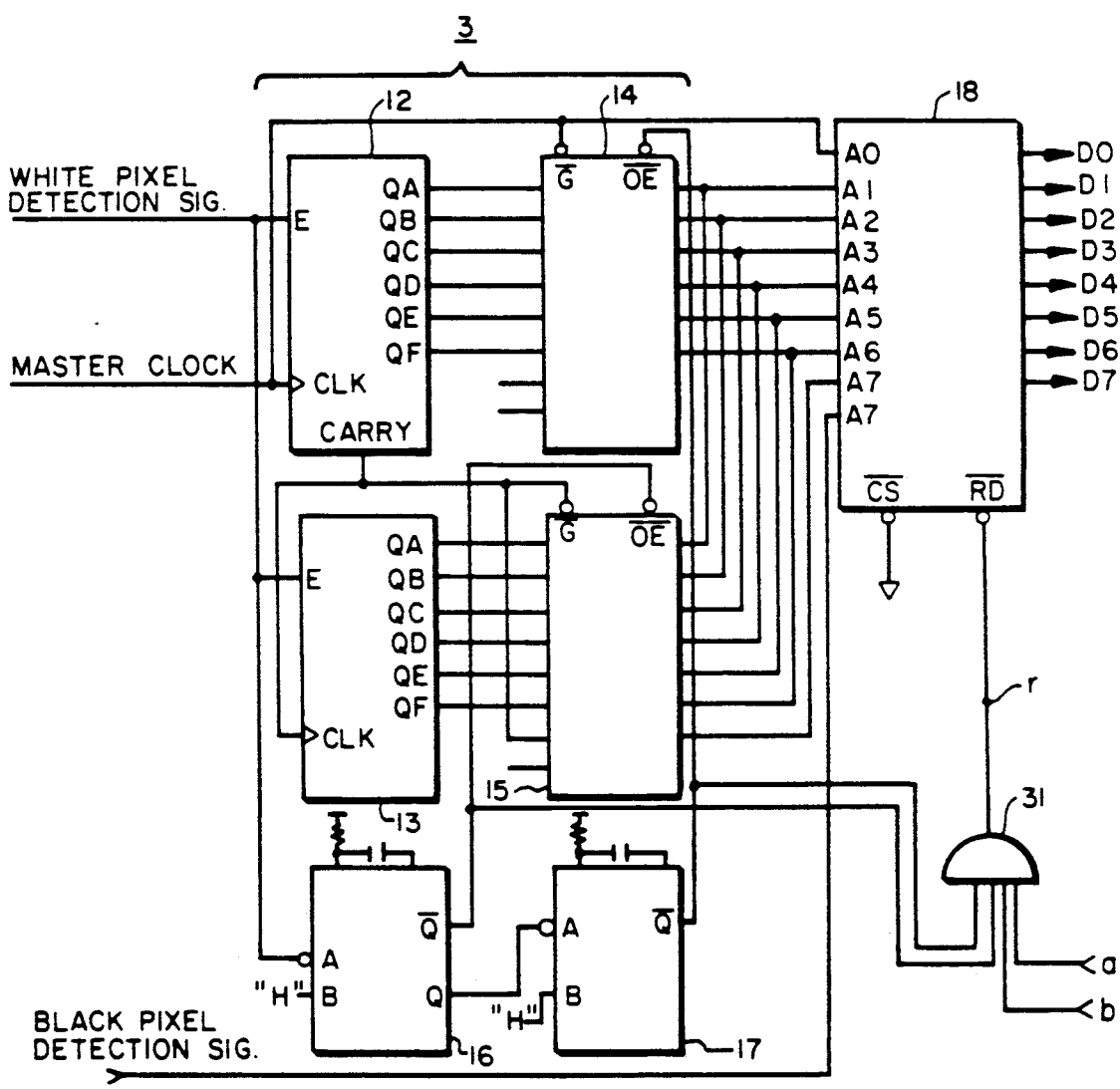
FIG. 3 is a detailed circuit diagram of the white run length calculating section in FIG. 1.

FIG. 3 is a detailed circuit diagram of the white run length calculating circuit shown in FIG. 1. If white pixel detecting signals of logic "1" level are outputted from the $\overline{Q}$ output terminal of D flip-flop 11 of the black/white pixel color discriminating secion 2, then the number of white pixels is counted by 6-bit counters 12, 13 in synchronization with the master clock. Then, if a change of the pixel appears, the counting operations of the counters 12, 13 are terminated, and the counted values are transferred to latches 14, 15 so that they should be used as the addresses in the look-up table 18.

Figure 4:
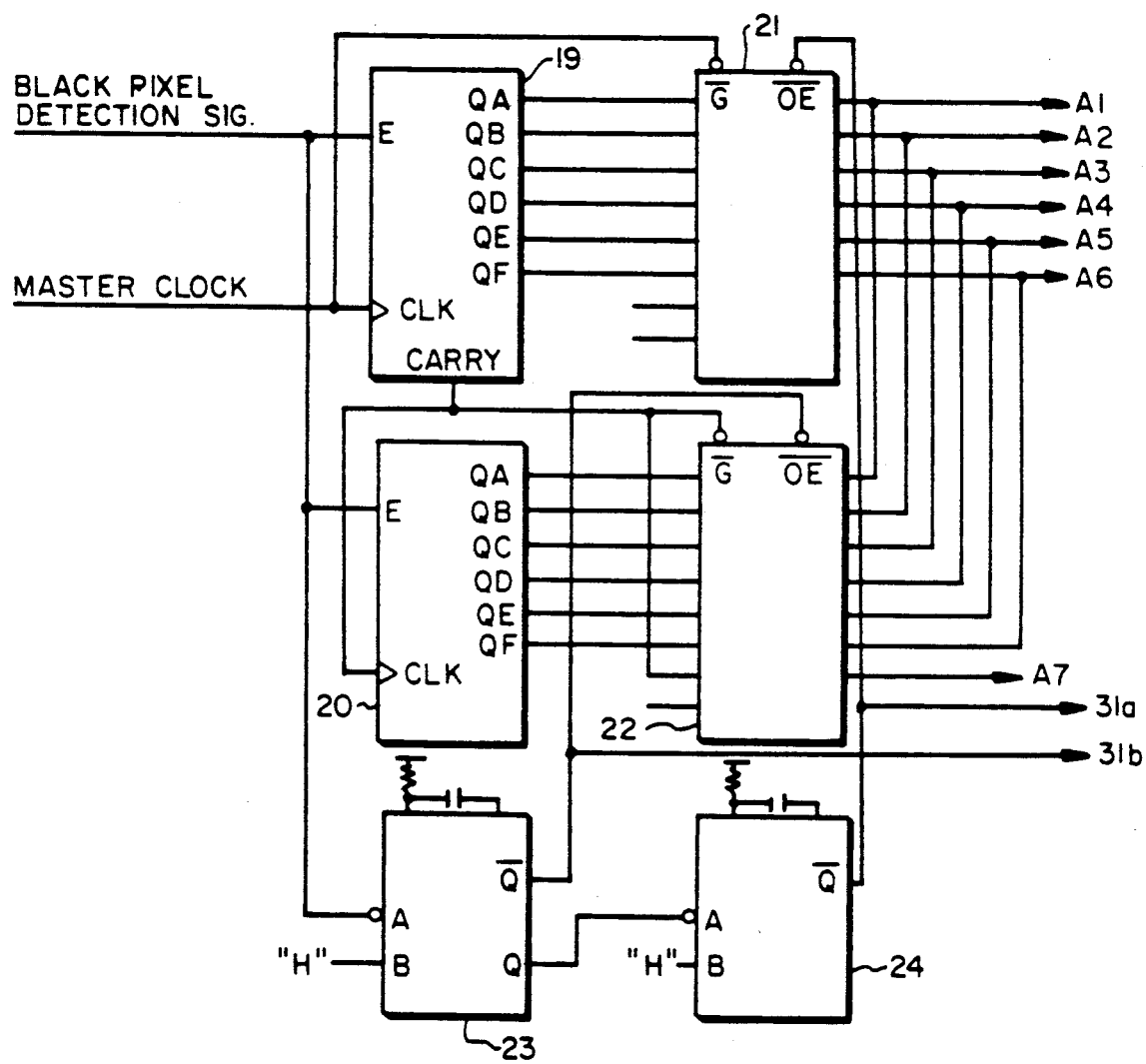
FIG. 4 is a detailed circuit diagram of the black run length calculating section in FIG. 1.

The constitution of the black run length calculating circuit shown in FIG. 4 is same as that of the white run length calculating circuit 3 of FIG. 3. The only difference is that the circuit 3 of FIG. 3 will be operated for the black pixel running, and the circuit of FIG. 4 for the white pixel running. Therefore, for the sake of the describing convenience, only the operation of the circuit of FIG. 3 will be described.

The 6-bit counters 12, 13 of FIG. 3 are for counting the white pixel run length: the 6-bit counter 12 copes with terminating codes for the run length of 0–63, while the 6-bit counter 13 copes with make-up codes for the run length of 64-2560 in a modulo-64 counting. The 6-bit counter 12 which consists of a modulo-64 counting circuit outputs a carry signal each time when the run length of the inputted pixels becomes a multiple of 64, so that the counted value of the 6-bit counter 13 should be incremented. Thus the total run length equals to (counted value of the 6-bit counter 12)+(64×counted value of the 6-bit counter 13).

Latches 14, 15 are latching the count values of 6-bit counters 12, 13 in synchronization with the master clock. If a change of pixel occurs, the count value latched finally is supplied as for the ROM address for the black/white look-up table 18 in response to the control signals $\overline{OE}$ of monostable multivibrators 16 and 17. This will be described in more detail below. At the moment when the pixel detecting signal is shifted from logic "1" to logic "0", that is, when the signal is shifted from a white pixel to a black pixel, the monostable multivibrator 16 outputs through its $\overline{Q}$ output terminal a control signal $\overline{OE}$ for enabling a make-up code address value to be outputted, and the control signal $\overline{OE}$ is supplied to the latch 15 so that the latch 15 outputs a count value to be applied to the address terminals A1–A7 of the look-up table 18. At the same time, the look-up table 18 receives through an AND gate 31 a $\overline{Q}$ output from the monostable multivibrator 16, thereby being in an address signal read-in enable state. Accordingly, the look-up table 18 outputs a data corresponding to the white pixel make-up code in accordance with the signals received through the address terminal A0–A8.

Then, in response to the trailing edge of the pulse generated from the monostable multivibrator 16, the monostable multivibrator 17 supplies a control signal $\overline{OE}$ to the latch 14 in order to cause an outputting of a white pixel terminating code address value, so that the look-up table 18 should output a signal corresponding to the white pixel terminating code. However, in the case where the run lengths of the pixels counted by the counters 12 and 13 are smaller than 64, then they will be expressed only as the terminating codes, and therefore, in such a case, the make-up codes prior to the terminating codes are treated as dummy signals.

Further, if the level of the above described white pixel detecting signal is shifted to "0", that is, if the black pixel detecting signal becomes logic "1", then the black run length calculating circuit of FIG. 4 is activated to carry out coding operations in a manner similar to that of the white run length calculating circuit of FIG. 3.

As described above, if the start signal is supplied, first the white run length calculating circuit is activated in order to maintain the color synchronization. Then, if a pixel change occurs, the black run length calculating circuit is activated and the white run length calculating circuit is in turn activated for another pixel changes. As a result, the black and white run length calculating circuits are alternately operated to carry out codings until the whole data for one line are processed.

Now the look-up table 18 and the construction of the data stored therein will be described.

Although the white code look-up table 5 and the black code look-up table 6 of FIG. 1 are formed in separate entities, they can be implemented with a single memory device, as shown in FIG. 3, having a memory capacity larger than the sum of their respective memory capacities.

As shown in Table 1, the modified Huffman codes are of variable lengths in the range of 2 through 12 bits. Therefore, in order to assure that they can be processed in byte units, according to the embodiment of the present invention, all the codes outputted from the look-up table 18 consist of two bytes as shown in FIG. 7. Each of the codes stored in the look-up table consists of first and second bytes each having upper and lower nibbles. The upper and lower nibbles of the first byte and the upper nibble of the second byte represent the proper contents of the codes, while the lower nibble of the second byte represents the valid bit length of the code.

Table 2 below shows examples of codes stored in the look-up table for the cases the run lengths of white and black pixels are assumed to be any of 0 through 3.

TABLE 2

| White run length look-up table code | < B : Binary > Run length | Black run length look-up table code |
|---|---|---|
| 00110101B | 0 | 00001101B |
| 00001000B | | 11001010B |
| 00011100B | 1 | 01000000B |
| 00000110B | | 00000011B |
| 01110000B | 2 | 11000000B |
| 00000100B | | 00000010B |
| 10000000B | 3 | 10000000B |
| 00000100B | | 00000010B |

FIG. 6 illustrates a memory address map for the look-up table. As described above, the code for each run length has two bytes, and the terminating codes corresponding to the white run length of 0–63 are squentially positioned in the memory address 0000–0127, while the make-up codes corresponding to the white run length of 64 to 2560 which are a multiple of 64 are sequentially positioned in the memory address of 0128–0207. The black/white discriminating addresses are supplied to the input terminal A8 of the look-up table 18, and therefore, the codes corresponding to the run lengths of black pixels are positioned in the memory as follows. That is, the memory addresses 0256–0383 store the terminating codes for the black run lengths of 0–63, while the memory addresses 0384–0463 store the make-up codes for the run lengths of 64–2560.

Therefore, the white and black run length calculating circuits of FIGS. 3 and 4 respectively count the run lengths of white and black pixels, and supply the count values of the run lengths as the address of look-up table 18 for the relevant codes.

The address terminals A0–A8 of the black and white code look-up table 18 are connected in such a manner that they should be accord with FIG. 6. First, the pins A1–A6 represent the value of the run lengths in the terminating and make-up codes, while the pin A0 is connected to the master clock generator (not shown) in order to allocate two-byte data per run length in consideration of the fact that the unit of the codes consists of two bytes. Meanwhile, the pin A7 is an address pin for discriminating the terminating code and the make-up code. The addressing for the pin A7 is carried out by the carry signal of the 6-bit counter 12 of FIG. 3, when the run length is over 64. The carry signal is supplied through the latch 15 to the pin A7 of the look-up table 18.

Further, the pin A8, as described before, is an address pin for discriminating the white code region and the black code region, and the addressing of the pin A8 is carried out by a black pixel detecting signal.

Because of the nature of the constitution of the look-up table, all the codes outputted from the look-up table consist of two-byte data, inspite of the diversity of the length of valid data. Therefore, only the valid data have to be extracted from two-byte codes outputted from the code look-up table 18 of FIG. 3. The valid bit detecting of FIG. 8 are for carrying out such functions, i.e., the function of extracting the valid bits, and the function of combining the valid bits to output them in byte units.

Figure 8:
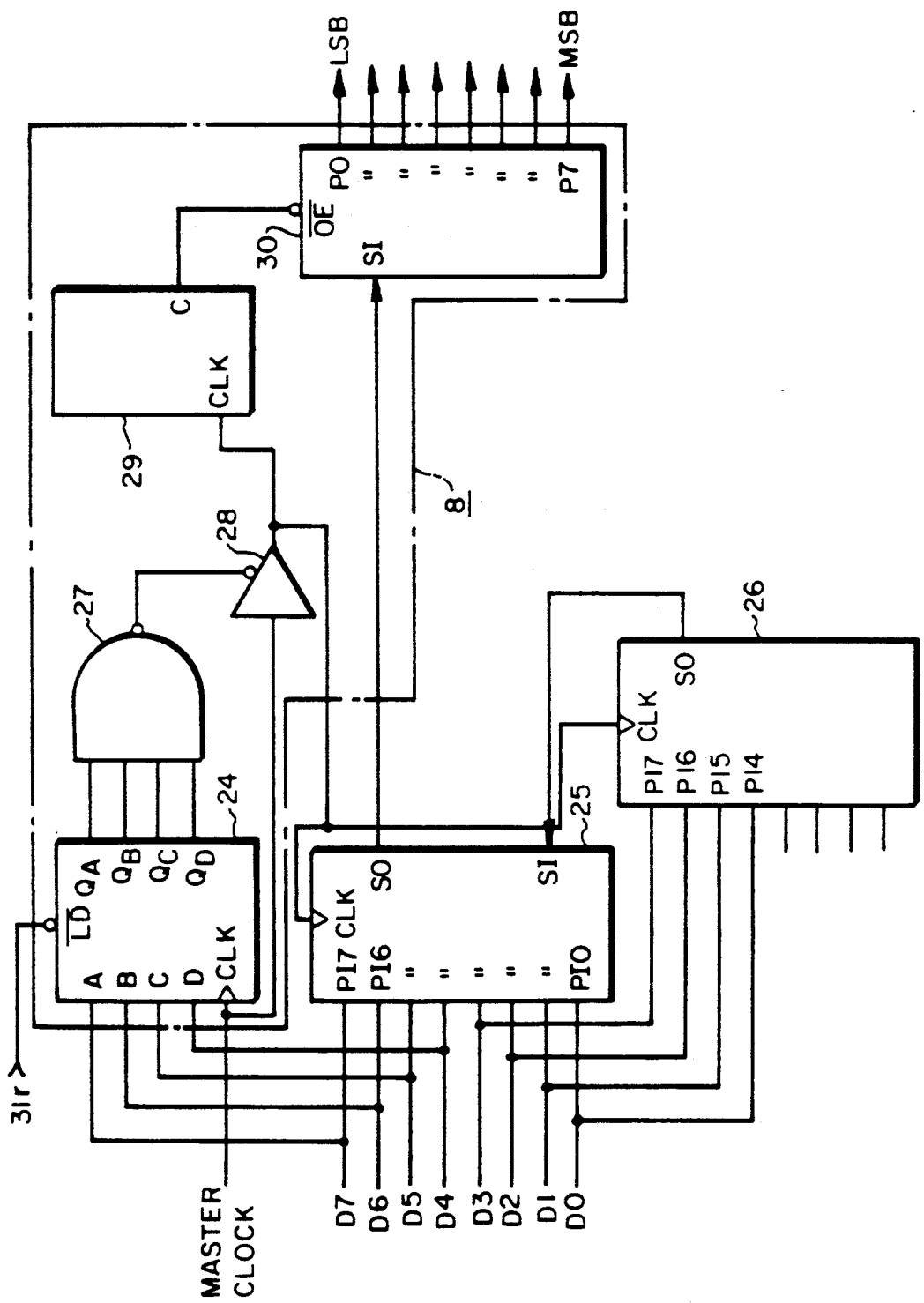
FIG. 8 is a detailed circuit diagram of the valid bit detecting section in FIG. 1.

First, to accomplish the valid bit detecting function, the first byte codes and the upper nibble codes of the second byte outputted from the look-up table 18 are respectively supplied to parallel input/serial output shifts registers 25, 26 of FIG. 8. The lower nibble data of the second byte represents the valid bit length of codes, and this value is loaded to a 4-bit downcounter 24 of FIG. 8 through the preset terminals A through D thereof in synchronization with the output r of AND gate 31 shown in FIG. 3.

Since the shift registers 25, 26 are coupled in cascade, and the parallel data stored in the shift registers 25, 26 will output in the order of the most significant bit MSB through the least significant bit LSB in the shift register 25, and the most significant bit of the upper nibble of the shift rgister 26. For this operation, taking the value of the valid bit length as the present value, the 4-bit downcounter 24 carries out downcountings until the preset value becomes "0", thereby controlling the shifting operations of the shift registers 25, 26 of FIG. 8. This will be described in more detail below. During the time when the downcounting operations of the 4-bit downcounter 24 are performed, a NAND gate 27 outputs a signal of logic "1" level and supplies it to the gate of a tristate buffer 28, which is in turn enabled thereupon. Accordingly, a master clock is supplied through the tristate buffer 28 to the shift registers 25, 26 so as for it to serve as a shifting clock, thereby effecting a shifting operation. The master clock is also supplied to a clock terminal CLK of a modulo-8 counter 29 to effect the counting of the number of the valid bits outputted from the shift register 25.

Thus, the valid bit which are sequentially extracted among the codes sent in two-byte units from the look-up table 18 are supplied to a serial input/parallel output shift register 30 of FIG. 8. Here, the valid data which are sequentially extracted are assembled into 8-bit units, and this function is controlled by the modulo-8 counter 29. When the number of the valid bits, which are serially extracted by the parallel input/serial output shift register 25 and supplied to the input terminal of the serial input/parallel output shift register 30, reaches 8, the modulo-8 counter 29 outputs an output enable signal $\overline{OE}$ through its output terminal C, and supplies the signal $\overline{OE}$ to the shift register 30 to enable it, so that the shift register 30 should output coded data in byte units.

As described above, according to the present invention, the coding and the compression of binary image data are carried out in the real time, and therefore, an efficient utilization of the computer memory and a shortening of the data processing time can be achieved.

What is claimed is:

1. An image data coding apparatus for coding binary image data, comprising:
   a FIFO memory for sequentially reading binary image data, for outputting them in the inputted order;
   a pixel color discriminating section for discriminating the colors of the pixels outputted from said FIFO memory;
   black and white run length calculating sections for calculating the run lengths of the pixels of which color has been discriminated by said pixel color discriminating section;

black and white code look-up tables for receiving the address of the code position corresponding to the pixel run lengths outputted from said black and white run length calculating sections;

parallel input/serial output shift registers for shifting the parallel data outputted by said look-up tables into serial data form; and a valid bit detecting section for extracting only valid bits among serial data outputted from said parallel input/serial output shift register, and for generating parallel data in byte units.

2. The image data coding apparatus as claimed in claim 1, wherein said black and white run length calculating sections respectively comrise two 6-bit counters for counting the number of the succeeding pixels outputted from said pixel color discriminating section;

latches for latching the outputs of said 6-bit counters in synchronization with a master clock; and monostable multivibrators for supplying output enable control signals to said latches at the moment when the shifting of the pixel color is detected.

3. The image data coding apparatus as claimed in claim 1, wherein, from the lowest address of memory means of said code look-up tables, there are stored white pixel terminating codes, white pixel make-up codes, black pixel terminating codes, and black pixel make-up codes in the cited order.

4. The image data coding apparatus as claimed in claim 1, wherein said valid bit detecting section comprises a 4-bit downcounter for presetting the value of the valid bit length among the data outputted by said look-up tables, and for controlling the shifting operations of said parallel input/serial output shift register until said preset value becomes "zero", in order to extract only the valid bits among the output data of said parallel input/serial output shift register;

a tristate buffer for transferring the master clock to the shift clock terminal of said parallel input/serial output shift register in accordance with the predetermined level of the signal supplied to its gate;

a NAND gate for receiving the output of said 4-bit downcounter, and for generating control signals to be supplied to the gate of said tristate buffer;

a serial input/parallel output shift register for converting the serial output data of said parallel input/serial output shift register into parallel data; and a modulo-8 counter for counting the number of the master clocks through said tristate buffer corresponding to the number of the valid bits, and for supplying to said serial input/parallel output shift register the output enable control signals which enables said serial input/parallel output shift register to output coded data in byte units.

* * * * *